(No Model.)
W. LEWIS.
DRAFT EQUALIZER.
No. 492,939. Patented Mar. 7, 1893.
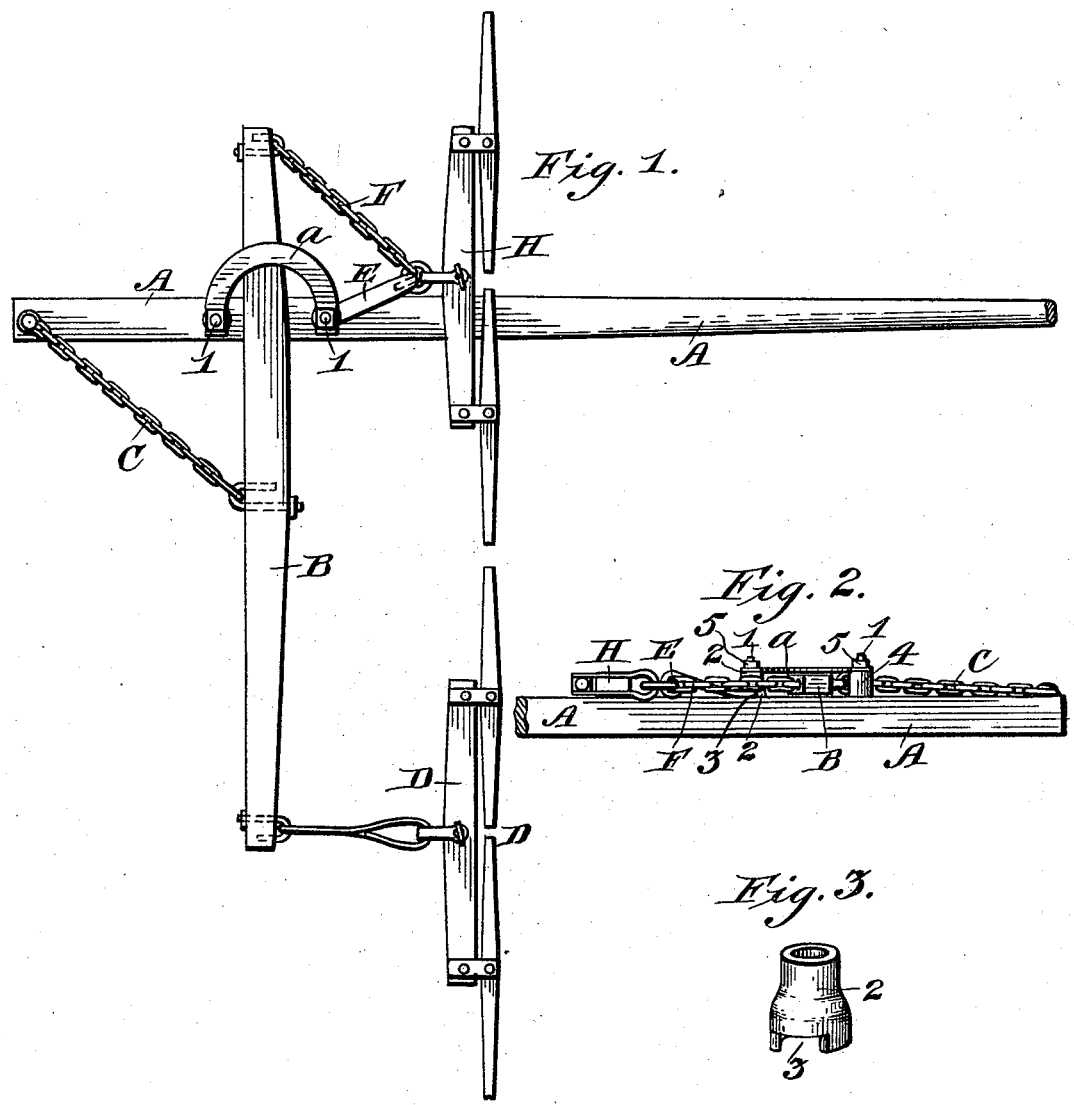

UNITED STATES PATENT OFFICE.

WILLIAM LEWIS, OF SAUK CENTRE, MINNESOTA.

DRAFT-EQUALIZER.

SPECIFICATION forming part of Letters Patent No. 492,939, dated March 7, 1893.

Application filed November 8, 1892. Serial No. 451,344. (No model.)

*To all whom it may concern:*

Be it known that I, WILLIAM LEWIS, a citizen of the United States, residing at Sauk Centre, in the county of Stearns and State of Minnesota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to certain improvements on the draft equalizer shown in Letters Patent of the United States, numbered 408,727, granted to me on the 13th day of August, 1889. And it consists in certain improvements—whereby a more efficacious attachment of the double tree to the tongue and evener and equalizing bar is effected, and for this purpose it consists in the construction, arrangement and combination of the parts of which it is composed, as will be hereinafter more fully described and claimed.

Referring to the accompanying drawings in which corresponding parts are designated by similar marks of reference: Figure 1 is a plan view of my improved equalizer. Fig. 2 is a detail side view thereof. Fig. 3 is a detail perspective view of the forward collar.

The evener or equalizing bar B is secured to the rear of the tongue A by the draw link C, and has its one end passing between the bracket *a* and the tongue, the former being secured to the latter by the bolts 1, while upon the opposite end of the evener or equalizing bar is secured to the double tree D, or its equivalent.

All the above described construction is fully shown in my hereinbefore mentioned Letters Patent, and therefore, requires no further description here.

The double tree H is secured to the forward end of a connecting link F, the rear end of which is secured to the end of the evener or equalizing bar, and also to the forward end of a second connecting link E, as is also described in the said patent, but instead of pivoting the rear end of the link E to the bracket on one side of the center of the tongue, as is shown therein, the link is made somewhat shorter than the connecting link F, and has its rear end secured by the forward bolt 1 of the tongue and bracket, which bolt passes therethrough. In order to retain the link E in place at the bottom of the bolt, a collar 2 is mounted on the said bolt, and has a recess 3 formed in its bottom, through which recess the rear end of the link projects. A similar collar 4, but without the recess, surrounds the rear bolt 1, the brackets being thus clamped between the upper ends of the collars and the nuts 5 mounted on the upper ends of the said bolts 1.

The operation of my present invention is obviously similar to that described in my hereintofore mentioned Letters Patent, and need not, therefore, be further described herein, except to state that by connecting the rear end of the link directly to the bolt E (which is centrally located on the tongue) instead of attaching it to one side of the bracket, a better equilibrium of the forces upon the ends of the draft bars is obtained, and a stronger and more simple, and therefore cheaper construction produced.

Having thus described my invention, what I claim, and desire to secure by Letters Patent, is—

In a draft equalizer, the combination with a tongue, of a bracket, bolts securing the said brackets to the upper surface of the tongue; a collar surrounding one of the said bolts between the bracket and the tongue and having a recess in the bottom thereof; an evener bar connected with the said tongue and passing between the said bracket and tongue, a double tree connected to each end of the said evener bar, and a link having its forward end secured to one of the double trees and its rear end extending through the recess in the collar and being engaged by the bolt in the tongue, the said link being shorter than the connection between the double trees and the draft bar, substantially as described.

In testimony whereof I affix my signature in presence of two witnesses.

WILLIAM LEWIS.

Witnesses:
C. M. SPRAGUE,
M. A. SCHELDRUP.